June 23, 1970    W. J. VAN DER GRINTEN    3,516,862
RECHARGEABLE ALKALINE-ZINC CELL WITH POROUS MATRIX CONTAINING
TRAPPING MATERIAL TO ELIMINATE ZINC DENDRITES
Filed April 1, 1968

Inventor:
Willem J. van der Grinten,
by Paul R. Webb, II
His Attorney.

United States Patent Office 3,516,862
Patented June 23, 1970

3,516,862
RECHARGEABLE ALKALINE-ZINC CELL WITH POROUS MATRIX CONTAINING TRAPPING MATERIAL TO ELIMINATE ZINC DENDRITES
Willem J. van der Grinten, Scotia, N.Y., assignor to General Electric Company, a corporation of New York
Filed Apr. 1, 1968, Ser. No. 717,499
Int. Cl. H01m 43/02
U.S. Cl. 136—30                 8 Claims

ABSTRACT OF THE DISCLOSURE

A rechargeable alkaline-zinc cell has a positive electrode, a zinc negative electrode, an alkaline electrolyte, and a chemically inert porous matrix with a trapping material in the form of microscopic particles which is incorporated into the negative electrode or is positioned adjacent the negative electrode. A process is described for generating electrical energy from such a rechargeable alkaline-zinc cell.

Rechargeable alkaline-zinc cell

Figure 1:
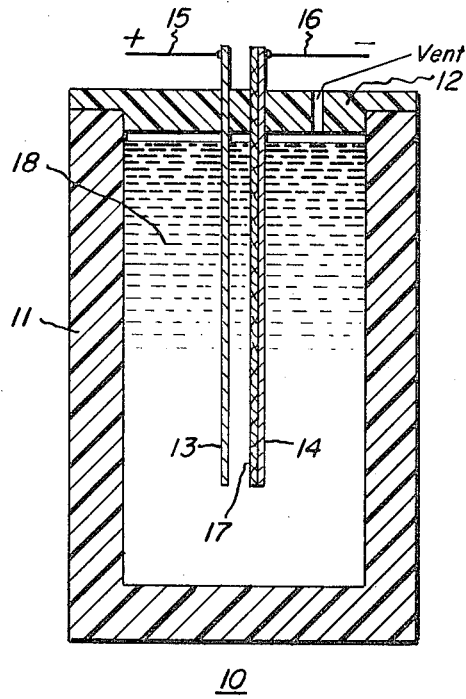

This invention relates to rechargeable alkaline-zinc cells and methods of generating electrical energy therefrom and, more particularly, to rechargeable alkaline-zinc cells wherein a porous matrix with trapping material is employed as a part of the negative electrode or positioned adjacent the negative electrode to eliminate zinc dendrite shorting during the cell charge, and to methods of generating electrical energy without the interference of zinc dendrite shorting.

Rechargeable alkaline-zinc cells are useful for a variety of applications providing electrical energy upon discharge of the cell. Such cells are further desirable in that the cells are chargeable after discharge. Such cells include, for example, silver-zinc, nickel-zinc, manganese dioxide-zinc, zinc-oxygen and zinc-air cells.

Presently, a major problem in a rechargeable alkaline-zinc cell is the extended formation of zinc dendrites during the recharging cycle which short out and thereby destroy the cell. These dendrites are formed from the reduction of soluble potassium zincate which is present in the alkaline electrolyte when the zinc electrode has been discharged previously.

The above problem of zinc dendrite shorting in rechargeable alkaline cells has been reported by N. A. Zhulidov in U.S.S.R. Author's Certificate No. 116,812 filed on Mar. 7, 1958, and by N. A. Zhulidov and E. I. Efremov in an article entitled "A New Nickel-Zinc Accumulator" in Vest. Elektroprom., 1963, 34, No. 2, February, 74–75. The above Author's Certificate proposes as the negative electrode in an alkaline storage cell the use of a reversible negative electrode containing calcium zincate. The above article describes a nickel-zinc battery wherein the negative electrode is made from a mixture of zinc and hydroxide components.

In primary alkaline cells, calcium hydroxide has been employed to regenerate the electrolyte thereby reducing the amount of electrolyte in the cell. This is described, for example, in U.S. Letters Patent 2,180,955, wherein a finely divided cellulose material, calcium hydroxide, sodium hydroxide and water are formed into a solid mass, covered with pervious material and positioned in the bottom of the cell out of contact with the electrodes.

It would be desirable to provide an improved rechargeable alkaline-zinc cell construction whereby zinc dendrite shorting is eliminated and to provide an improved method of preventing zinc dendrite shorting. The present invention is directed to improved rechargeable alkaline-zinc cells and to improved methods of generating electrical energy from rechargeable alkaline-zinc cells which do not have the disadvantage of zinc dendrite shorting.

It is a primary object of my invention to provide an improved rechargeable alkaline-zinc cell which eliminates zinc dendrite shorting thereby prolonging the life of the cell, and reducing the size and weight of the cell in comparison to other long life rechargeable cells, such as nickel-cadmium cells.

It is a further object of my invention to provide a new and improved method for generating electrical energy from a rechargeable alkaline-zinc cell during which process no zinc dendrite shorting is encountered.

In accordance with my invention, a rechargeable alkaline-zinc cell comprises a zinc negative electrode, a positive electrode spaced from the negative electrode, and a chemically inert porous matrix with a trapping material which is incorporated into the negative electrode or is positioned adjacent the negative electrode. Additionally, a process is described for generating electrical energy from such a rechargeable alkaline-zinc cell.

Figure 2:
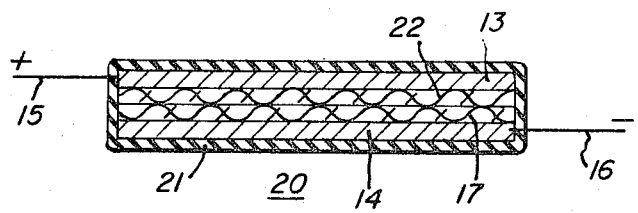

These and various other objects, features and advantages of the invention will be better understood from the following description taken in connection with the accompanying drawing in which:

FIG. 1 is a sectional view of a flooded type of rechargeable alkaline-zinc cell embodying my invention; and FIG. 2 is a sectional view of a starved type of rechargeable alkaline-zinc cell embodying my invention.

In FIG. 1 of the drawing, there is shown a flooded type of rechargeable alkaline-zinc cell 10 which comprises a casing 11 with a top closure 12 containing a vent. A positive electrode 13 and a zinc negative electrode 14 are positioned within casing 11 and spaced apart. A suitable electrical lead 15 is connected to positive electrode 13 while a suitable electrical lead 16 is connected to negative electrode 14. These leads 15 and 16 are connected to a suitable electrical load (not shown) to provide electrical energy during the discharge cycle of the cell. A porous matrix 17, which is chemically inert to the electrolyte which will be used and to electrodes 13 and 14, is shown positioned adjacent negative electrode 14. Matrix 17 contains trapping material in the form of microscopic particles of calcium hydroxide [Ca(OH)$_2$], calcium oxide [CaO] or calcium zincate

$$[GaZn(OH)_4 \cdot H_2O]$$

An alkaline electrolyte 18 fills at least partially the casing 11 so that electrodes 13 and 14, and matrix 17 are contacted thereby. It will, of course, be appreciated that when the alkaline electrolyte, such as potassium hydroxide, is placed in casing 11, trapping material of calcium oxide would be converted to calcium hydroxide.

In FIG. 2 of the drawing there is shown a starved type of rechargeable alkaline-zinc cell 20 with a casing 21, which is shown as electrically insulating. A zinc negative electrode 14 has positioned adjacent its surface a porous matrix 17. A chemically inert, absorbent material 22 is positioned between matrix 17 and positive electrode 13 thereby spacing the positive electrode from matrix 17. Electrical leads 15 and 16 are connected to the positive and negative electrodes respectively. An alkaline electrolyte, such as potassium hydroxide, is impregnated in electrodes 13 and 14, matrix 17 and material 22.

I discovered that a rechargeable alkaline-zinc cell can be constructed in a charged condition which comprises a zinc negative electrode, an alkaline electrolyte, a chemically inert porous matrix containing trapping material positioned adjacent the negative electrode, and a positive electrode spaced from the matrix.

The zinc negative electrode requires an electronically conductive substrate and a high surface area of zinc. Various electronically conductive substrates which may be employed include silver, copper, lead, tin and zinc. It is desirable to amalgamate these substrates thereby reducing the self-discharge rate of the cell in which the substrate is employed. A high surface area of zinc is required on the substrate for the electrode to operate effectively in a cell. While the negative electrode can be constructed of zinc, it is more desirable to employ one of the above types of substrates with a high surface area of zinc added thereto in the orm of zinc particles or zinc dendrites. The zinc material can be applied to the substrate by pasting zinc material thereon or by merely positioning the zinc material thereon. It is desirable to amalgamate the zinc particles or dendrites by the addition of finely divided mercuric oxide thereto. The positive electrode can be selected from a variety of electrodes such as silver, nickel, manganese dioxide or an air type of cathode.

I found that a porous matrix with trapping material therein prevents cementation of the calcium zincate in the electrolyte during discharge of the cell. Such a matrix, with a small pore size, must be positioned adjacent the negative electrode or incorporated in the negative electrode. Further, the matrix must be chemically inert to the electrolyte as well as to the electrode materials.

Various porous matrices which are suitable in the practice of my invention include nylon, Dynel, polypropylene, polyethylene, or potassium titanite. When materials of the above type, except for the potassium titanite, are used, it is preferred that a velvet type fabric be made from the material. The short erect thread portion of the velvet functions as the matrix while the woven portion functions as a separator or spacer. I have found that the use of such a velvet type fabric provides a matrix with a short erect thread portion which will retain a trapping material uniformly, retard the cementation effect, and retain uniform porosity. The trapping materials which are of advantage in my invention include calcium hydroxide, calcium oxide and calcium zincate. When these trapping materials are used, it is normally necessary to have sufficient calcium in the trapping material which will combine with up to 100 percent of the reacting zinc which enters the electrolyte during discharge of the cell. In this manner, upon discharge of the cell the trapping material will produce calcium zincate. The present cell requires further that the positive electrode be spaced from the matrix containing the trapping material. This may be accomplished in addition to the use of the woven portion of a velvet fabric in several ways. For example, a space is provided between the matrix and the positive electrode, a spacer is provided therebetween or an absorbent pad for electrolyte is located between the matrix and the positive electrode.

With my cell, I found various alkaline electrolytes may be employed. However, I prefer to employ potassium hydroxide.

The porous matrix with trapping material therein must be positioned adjacent the negative electrode or incorporated therein whereby the calcium from the trapping material converts the potassium zincate in the electrolyte solution upon cell discharge into calcium zincate. Upon subsequent charging of the cell, the calcium zincate is converted to potassium zincate. The extended zinc dendrite formation, which is common in these types of cells and leads to their destruction, is eliminated.

With a potassium hydroxide electrolyte, I found further that the above potassium zincate solubility of calcium zincate in the electrolyte must be maintained lower than the solubility of zinc oxide in the electrolyte. Such a condition is theoretically satisfied provided not more than 40 weight percent of potassium hydroxide is employed. I prefer to maintain the concentration of the electrolyte at a level not higher than 30 weight percent for more effective results.

While the above conditions of solubility are maintained with a very low concentration of potassium hydroxide, such as for example, less than 1 weight percent, a second problem arises. When less than about 5 weight percent is employed, it becomes difficult to recharge the cell. Thus, based upon the above required conditions, the preferred concentration of the potassium hydroxide should be between about 5 weight percent to 30 weight percent of potassium hydroxide. It will, of course, be appreciated that in the practice of the present invention the electrolyte must be clean and fresh.

If calcium hydroxide powder is employed as the trapping material in a porous matrix, it must not be easily passivated. Such material is frequently covered with a very thin layer of calcium carbonate. If a small amount of calcium carbonate is present, calcium passivation due to the carbonate contamination can be eliminated by subsequent ionic current flow in the cell. However, if the carbonate contamination is excessive, the trapping material will not function to prevent extended dendrite formation.

I found further that the above trapping materials which are contained in the porous matrix must be of microscopic size and must remain small in the practice of this invention. The trapping material must be positioned adjacent the negative electrode and spaced from the positive electrode. If the trapping material is located adjacent the positive electrode, cell shorting results. The spacing between the trapping material and the positive electrode may be accomplished by positioning the positive electrode at a spaced interval from the matrix containing the trapping material. If desired, a chemically inert porous separator may be employed between the matrix and positive electrode to provide this spacing or separation. Further, an absorbent material which is chemically inert to the cell components and to the electrolyte may be positioned between the positive electrode and the matrix to provide the required separation. This spacing between the positive electrode and the trapping material provides an area in which oxygen from the positive electrode can oxidize any zinc present in this region.

I discovered that a rechargeable alkaline-zinc cell can be constructed in a discharged condition which comprises an electronically conductive substrate, an alkaline electrolyte, a chemically inert porous matrix containing trapping material and zinc oxide positioned adjacent the electronically conductive substrate, and a positive electrode spaced from the matrix.

Various electronically conductive substrates which may be included are silver, copper, lead, tin and zinc. It is desirable to amalgamate these substrates thereby reducing the self-discharge rate of the cell in which the substrate is employed. A porous matrix with a trapping material therein is employed and positioned adjacent the substrate. Both the matrix and trapping material are of the same type as described above for such a cell in a charged condition. A similar positive electrode and spacing between the matrix and the positive electrode are provided as in the above type of cell in a charged condition. Additionally, zinc oxide is added to the matrix. This cell in discharged condition can be produced as described above.

However, it may be desirable to provide the above-described cell in a charged condition rather than in a discharged condition. In such an event, an alkaline electrolyte, as described above, is added to the cell and the cell is charged. Upon charging, zinc from the zinc oxide in the porous matrix will grow on the substrate in the form of porous zinc. During the charging, some of the electrolyte will react with the zinc oxide and calcium hydroxide to produce potassium zincate. Upon the growth of the porous zinc, the electronically conductive substrate is formed into a negative electrode having an electronically conductive substrate, a high surface area of zinc on the substrate, a chemically inert porous matrix with trapping material therein, and the matrix imbedded in the zinc.

I found further that electrical energy can be generated from such a cell without the disadvantage of extended zinc dendrite formation and shorting by providing a zinc negative electrode, providing an alkaline electrolyte in contact with the negative electrode, providing a positive electrode in contact with the electrolyte and spaced from the negative electrode, providing a chemically inert porous matrix with a trapping material therein, positioning the matrix adjacent the negative electrode and spaced from the positive electrode, and applying an electrical load across the electrodes.

In an illustrative operation of alkaline-zinc cell 10 shown in FIG. 1 of the drawing, a casing 11 is provided with a top closure 12 containing a vent. A positive electrode 13 of nickel and a zinc negative electrode 14 are positioned within casing 11 and spaced apart. Electrical leads 15 and 16 from electrodes 13 and 14 are connected through a switch (not shown) to an electrical load such as an electrical light bulb. A chemically inert, porous matrix 17, which contains trapping material of microscopic calcium hydroxide is positioned adjacent negative electrode 14 and spaced from positive electrode 13. An alkaline electrolyte 18 of 20 weight percent potassium fills partially casing 11 so that the electrodes 13 and 14, and matrix 17 are contacted thereby. When the switch is closed, thereby discharging the cell, the calcium hydroxide reacts with the potassium zincate in the electrolyte solution to form solid calcium zincate, but cementation is prevented. When the cell is recharged subsequently, the calcium zincate is converted into potassium zincate. The conventional extended zinc dendrite formation does not result thereby shorting the cell.

Rechargeable alkaline-zinc cell 20 shown in FIG. 2 operates in the same manner as the cell shown in FIG. 1. However, a chemically inert, absorbent material 22 is positioned between matrix 17 and positive electrode 13 thereby spacing the positive electrode from matrix 17.

An example of a rechargeable alkaline-zinc cell and a process for generating electrical energy therefrom in accordance with my invention is set forth below:

EXAMPLE 1

A hermetically sealed, horizontally positioned rechargeable alkaline nickel-zinc cell, using a starved electrolyte, was constructed as follows. A negative zinc electrode comprising a zinc substrate of 10 cm.$^2$ in surface area and an electrical lead connected thereto was mounted on top of a horizontally positioned lucite holder. Finely divided zinc powder was distributed evenly over the active surface area to form the active zinc electrode material. A piece of nylon velvet slightly larger than the the zinc electrode was loaded with calcium hydroxide powder and positioned on top of the zinc powder with the calcium hydroxide layer facing downward. An unwoven nylon separator layer was positioned on top of the woven portion of the nylon velvet. This separator extended downward beyond the width of the cell area to make physical contact with the potassium hydroxide electrolyte, which was positioned in a small reservoir below the cell level. The capillarity of this separator insured the even distribution of this electrolyte containing 20 weight percent of potassium hydroxide throughout the component parts of the cell. A positive nickel electrode of the type employed in a nickel cadmium battery, the surface area of which was identical to that of the zinc electrode and provided with an electrical lead, was positioned on top of this package. Some mechanical pressure was provided to insure intimate contact between the individual layers at all locations.

The above cell was operated by connecting the leads from the respective electrodes to an electrical load resistor. The cell was discharged at 0.1 a. for a period of 100 minutes. The cell was recharged for 5 hours using a constant voltage power supply adjusted to 2.025 volts. After 1000 cycles, the cell continued to function effectively. The cell was then disassembled and examined. No evidence of extended zinc dendrite formation was found in the vicinity of the positive electrode.

While other modifications of the invention and variations thereof which may be employed within the scope of the invention have not been described, the invention is intended to include such as may be embraced within the following claims.

What I claim as new and desire to secure by Letters Patent of the United States is:

1. A rechargeable alkaline-zinc cell comprising a zinc negative electrode, and a positive electrode spaced from the negative electrode, in which the improvement comprises a chemically inert porous matrix with a trapping material in the form of microscopic particles therein selected from the class consisting of calcium hydroxide and calcium oxide and the matrix positioned adjacent the negative electrode between the negative electrode and positive electrode and spaced from the positive electrode.

2. A rechargeable alkaline-zinc cell as in claim 1, in which the porous matrix is formed by the short erect thread of a velvet fabric, and the spacing between the matrix and the positive electrode is formed by the woven portion of the velvet fabric.

3. A rechargeable alkaline-zinc cell as in claim 1, in which an alkaline electrolyte is in contact with both of the electrodes and with the matrix.

4. A rechargeable alkaline-zinc cell as in claim 3, in which the electrolyte is potassium hydroxide, and the concentration of the potassium hydroxide is in the range of 5 to 30 weight percent.

5. A rechargeable alkaline-zinc cell comprising an electronically conductive substrate, and a positive electrode spaced from the substrate, in which the improvement comprises a chemically inert porous matrix with a trapping material in the form of microscopic patricles selected from the class consisting of calcium hydroxide and calcium oxide and zinc oxide therein, and the matrix positioned adjacent the substrate between the negative electrode and positive electrode, and spaced from the positive electrode.

6. A rechargeable alkaline-zinc cell comprising a zinc negative electrode, and a positive electrode spaced from the negative electrode, in which the improvement comprises a zinc negative electrode comprising an electronically conductive substrate, a high surface area of zinc on the substrate, a chemically inert porous matrix with a trapping material in the form of microscopic particles selected from the class consisting of calcium hydroxide and calcium oxide therein, and the matrix imbedded in the zinc surface and positioned between the negative electrode and the positive electrode and spaced from the positive electrode.

7. A rechargeable alkaline-zinc cell as in claim 6, in which an alkaline electrolyte is in contact with both of the electrodes.

8. A process for generating electrical energy from a rechargeable alkaline-zinc cell comprising providing a zinc negative electrode, providing an alkaline electrolyte in contact with the negative electrode, and providing a positive electrode in contact with the electrolyte and spaced from the negative electrode, in which the improvement comprises providing a chemically inert porous matrix with a trapping material in the form of microscopic particles selected from the class consisting of calcium hydroxide and calcium oxide therein, positioning the matrix adjacent the negative electrode between the negative electrode and positive electrode and spaced from the positive electrode, and applying an electrical load across the electrodes.

References Cited

UNITED STATES PATENTS

| | | | |
|---|---|---|---|
| 1,864,652 | 6/1932 | Heise | 136—154 |
| 2,880,258 | 3/1959 | Pucher et al. | 136—30 |
| 3,075,032 | 1/1963 | Andre | 136—6 |
| 3,201,281 | 8/1965 | Solomon et al. | 136—30 |
| 3,226,260 | 12/1965 | Drengler | 136—30 |
| 3,272,653 | 9/1966 | Solomon et al. | 136—30 |
| 3,333,986 | 8/1967 | Chreitzberg et al. | 136—30 |

WINSTON A. DOUGLAS, Primary Examiner

C. F. LeFEVOUR, Assistant Examiner

U.S. Cl. X.R.

136—6